(12) United States Patent
Kumon et al.

(10) Patent No.: US 10,291,860 B2
(45) Date of Patent: May 14, 2019

(54) IMAGE PICKUP SYSTEM THAT PROVIDES AUTOMATIC RADIATING DIRECTION CONTROL, IMAGE PICKUP APPARATUS, AND CONTROL METHOD THEREFOR

(71) Applicant: CANON KABUSHIKI KAISHA, Tokyo (JP)

(72) Inventors: Sayaka Kumon, Tokyo (JP); Yuta Masuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/787,981

(22) Filed: Oct. 19, 2017

(65) Prior Publication Data

US 2018/0139371 A1 May 17, 2018

(30) Foreign Application Priority Data

Nov. 11, 2016 (JP) .................. 2016-220628

(51) Int. Cl.
*H04N 5/235* (2006.01)
*H04N 5/232* (2006.01)
*H04N 5/225* (2006.01)

(52) U.S. Cl.
CPC ......... *H04N 5/2354* (2013.01); *H04N 5/2256* (2013.01); *H04N 5/2351* (2013.01);
(Continued)

(58) Field of Classification Search
CPC ............. H04N 5/2354; H04N 5/23212; H04N 5/2256; H04N 5/23245; H04N 5/2351; H04N 5/232121
See application file for complete search history.

(56) References Cited

U.S. PATENT DOCUMENTS

| 5,194,885 A * | 3/1993 | Spencer ................. G03B 15/05 396/182 |
| 2013/0050510 A1* | 2/2013 | Fujihashi ............... G03B 15/05 348/207.1 |

(Continued)

FOREIGN PATENT DOCUMENTS

| JP | 2015004803 A | 1/2015 |
| JP | 2015210427 A | 11/2015 |

*Primary Examiner* — Luong T Nguyen
(74) *Attorney, Agent, or Firm* — Rossi, Kimms & McDowell LLP (57) ABSTRACT

An image pickup system capable of, during flash photography through automatic radiating direction control, quickly starting a next shooting operation when the automatic radiating direction control is suspended. A flash built in or removably mounted on a digital camera has a light-emitting unit that emits light and a drive control unit that changes a radiating direction of light from the light-emitting unit. A preparatory operation for shooting and a shooting operation by the digital camera are disabled while the radiating direction of the light from the light-emitting unit is being changed by the drive control unit. When an instruction to suspend changing the radiating direction of the light is issued, a preparatory operation for shooting and a shooting operation by the digital camera, which have been disabled, are enabled, and the drive control unit is controlled to return the light-emitting unit to an initial position prior to the change.

17 Claims, 6 Drawing Sheets

(52) U.S. Cl.
CPC ..... *H04N 5/23212* (2013.01); *H04N 5/23245* (2013.01); *H04N 5/232121* (2018.08)

(56) References Cited

U.S. PATENT DOCUMENTS

| | | | |
|---|---|---|---|
| 2013/0314565 A1* | 11/2013 | Spielberg | G03B 15/05 348/224.1 |
| 2014/0368729 A1* | 12/2014 | Takai | H04N 5/2354 348/371 |
| 2015/0109754 A1* | 4/2015 | Takenaka | G03B 15/03 362/4 |
| 2015/0309390 A1 | 10/2015 | Yamamoto | |

\* cited by examiner

IMAGE PICKUP SYSTEM THAT PROVIDES AUTOMATIC RADIATING DIRECTION CONTROL, IMAGE PICKUP APPARATUS, AND CONTROL METHOD THEREFOR

BACKGROUND OF THE INVENTION

Field of the Invention

The present invention relates to an image pickup system, an image pickup apparatus, and a control method therefor, and in particular to a drive control technique for an image pickup system that is comprised of an image pickup apparatus such as a digital camera, and a light-emitting apparatus such as a flash built in or removably mounted on the image pickup apparatus.

Description of the Related Art

Some image pickup apparatuses such as digital cameras use a technique called bounce flash photography in which flash is directed onto a ceiling or the like, and a subject is irradiated with diffused light reflected from the ceiling or the like. In the bounce flash photography, a subject is indirectly illuminated, and hence the subject is rendered with soft light.

Examples of such image pickup apparatuses using the bounce flash photography include those which provide automatic radiating direction control (auto bounce drive control) in which an optimum radiating direction of flash is automatically determined to drive a flash. In the auto bounce drive, a radiating direction of flash from a light-emitting unit to a ceiling or the like is calculated and automatically set based on information about a distance to the ceiling or the like and information about a distance from a subject at the time of bounce flash photography.

In the auto bounce drive, to automatically determine a radiating angle of flash, a distance measurement is performed so as to obtain the distance information mentioned above, but a user wants to suspend the distance measurement in some cases, for example, when he or she wants to go back to normal shooting or switch to movie shooting.

There has been disclosed a technique in which, after the auto bounce drive is started by operating a plurality of operating buttons including a shutter release button, the auto bounce drive is suspended in response to the shutter release button being pressed halfway down, and the auto bounce drive is continued when the operating buttons are operated otherwise (see Japanese Laid-Open Patent Publication (Kokai) No. 2015-210427).

There has also been disclosed a technique in which a bounce position of a light-emitting unit is manually changed after the auto bounce drive is started, and when the bounce position is unsuitable for bounce flash photography, an auto bounce drive mode is canceled (see Japanese Laid-Open Patent Publication (Kokai) No. 2015-4803).

During the auto bounce drive, flash is radiated from a light-emitting unit for the purpose of distance measurement described above, and it is thus impossible to perform photometry and obtain AF parameters required for shooting. For this reason, a preparatory operation for shooting such as photometry or AF in response to, for example, a shutter release button being pressed halfway down, and shooting operations in response to, for example, the shutter release button being pressed all the way down are disabled during the auto bounce drive, and they are enabled after completion of the auto bounce drive.

However, according to Japanese Laid-Open Patent Publication (Kokai) No. 2015-210427 and Japanese Laid-Open Patent Publication (Kokai) No. 2015-4803, when suspending the auto bounce drive, it takes a relatively long time to mechanically stop it. For this reason, if the completion of a suspending process for the auto bounce drive is awaited, AF cannot be performed or the shutter release button cannot be operated, and hence the user risks missing the perfect moment to take a picture.

SUMMARY OF THE INVENTION

The present invention provides an image pickup system, an image pickup apparatus, and a control method therefor which are capable of, during flash photography through automatic radiating direction control, quickly starting a next shooting operation when the automatic radiating direction control is suspended.

Accordingly, the present invention provides an image pickup system that has an image pickup apparatus and a light-emitting apparatus built in or removably mounted on the image pickup apparatus and capable of communicating with the image pickup apparatus, the light-emitting apparatus having a light-emitting unit that emits light and a drive unit that changes a radiating direction of light from the light-emitting unit, comprising a disabling unit configured to disable a preparatory operation for shooting and a shooting operation by the image pickup apparatus while the radiating direction of the light is being changed by the drive unit, a determination unit configured to determine whether or not an instruction to suspend changing the radiating direction of the light by the drive unit has been issued, and a control unit configured to, when the determination unit determines that the instruction to suspend changing the radiating direction of the light by the drive unit has been issued, enable a preparatory operation for shooting and a shooting operation by the image pickup apparatus, which have been disabled by the disabling unit, and also control the drive unit such that the light-emitting unit returns to an initial position prior to the change.

According to the present invention, during flash photography through the automatic radiating direction control, a next shooting operation is quickly started when the automatic radiating direction control is suspended. This reduces the risk of the user missing the perfect moment to take a picture.

Further features of the present invention will become apparent from the following description of exemplary embodiments (with reference to the attached drawings).

DESCRIPTION OF THE EMBODIMENTS

Hereafter, an embodiment of the present invention will be described with reference to the drawings.

Figure 1:
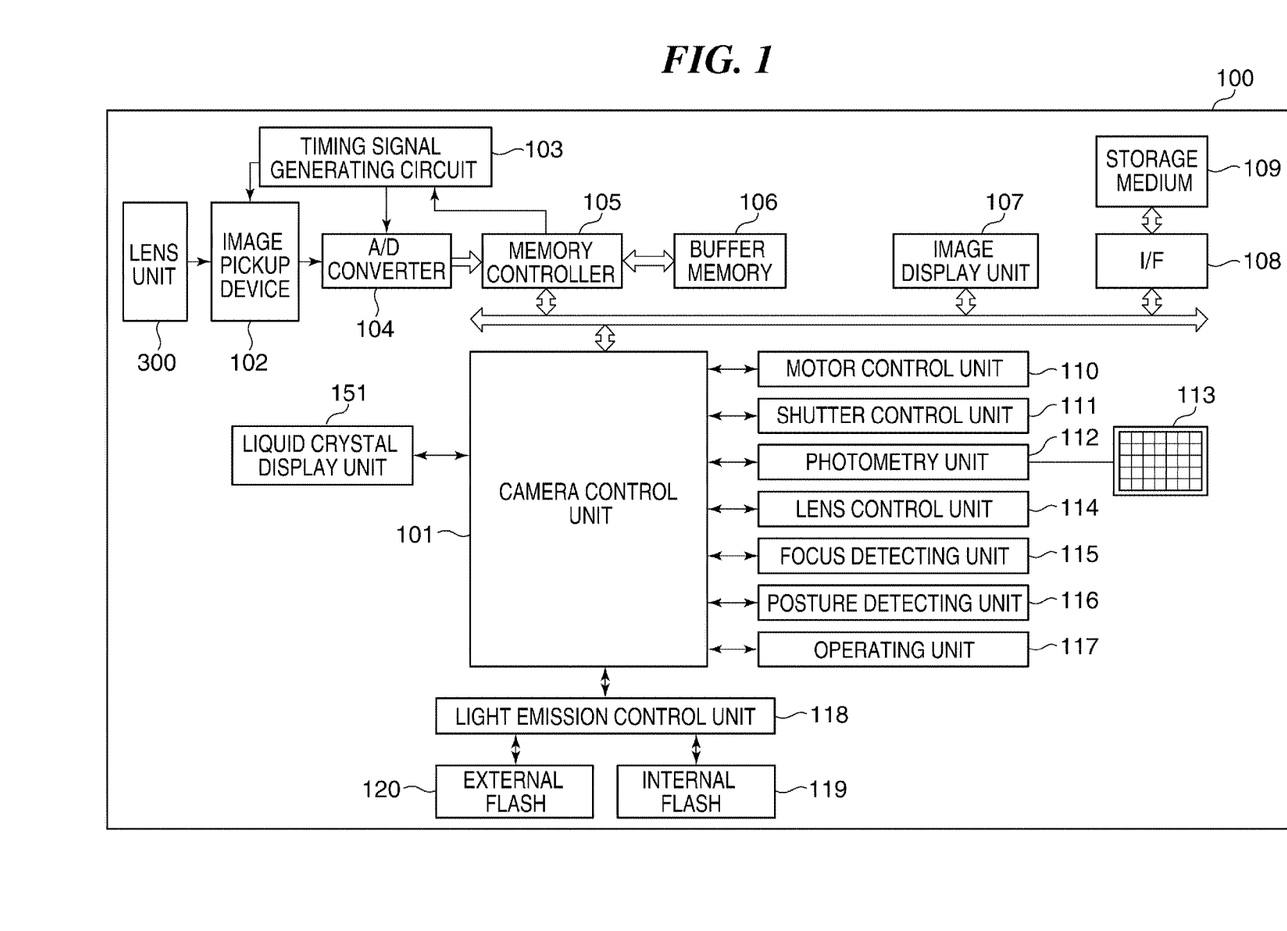
FIG. 1 is a block diagram schematically showing a system arrangement that is an exemplary embodiment of an image pickup system according to the present invention.

FIG. 1 is a block diagram schematically showing a system arrangement that is an exemplary embodiment of an image pickup system according to the present invention.

Referring to FIG. 1, a camera control unit 101 has a CPU, a RAM, a ROM, and so forth, and controls the overall operation of a digital camera 100 (hereafter referred to as the camera 100). An image pickup device 102, which is comprised of a CCD sensor, a CMOS sensor, or the like, generates an analog image signal by performing photoelectric conversion of an image formed by a beam from a subject passing through a shooting optical system of a lens unit 300. A timing signal generating circuit 103 generates timing signals required to operate the image pickup device 102. A built-in flash 119 is built in the camera 100, and an external flash 120 is removably mounted on the camera 100.

An A/D converter 104 converts analog image data read out from the image pickup device 102 into digital image data. A memory controller 105 contorts reading and writing from and to memory and refreshing actions of a buffer memory 106. An image display unit 107 displays image data stored in the buffer memory 106. An I/F 108 is an interface for connecting to a recording medium 109 such as a memory card or a hard disk.

A motor control unit 110 flips a mirror, not shown, up and down to change an optical path of the beam from the subject incident via the lens unit 300 by controlling a motor, not shown, in accordance with signals from the camera control unit 101. With the mirror flipped up, the beam from the subject incident via the lens unit 300 is guided to the image pickup device 102 or the like, and with the mirror flipped down, the beam from the subject incident via the lens unit 300 is guided to a photometric sensor 113 or the like.

A shutter control unit 111 controls a shutter, not shown, which is placed on a front side of the image pickup device 102 and switches the image pickup device 102 between a light-shielded state and an exposed state in accordance with signals from the camera control unit 101. A photometry unit 112 outputs photometric values, which are photometry results for respective split areas of a shooting screen, to the camera control unit 101 based on outputs from the photometric sensor 113 which performs photometry in each of the areas.

Based on the photometry results for the respective areas, the camera control unit 101 performs exposure computations so as to determine an AV (aperture value), a TV (shutter speed), and an ISO (shooting sensitivity) which are exposure control values for use in shooting. Also, based on photometric values output from the photometry unit 112 when the built-in flash 119 or the external flash 120 pre-fires at the subject, the camera control unit 101 computes an amount of light emitted from the built-in flash 119 or the external flash 120 at the time of flash shooting.

The lens control unit 114 adjust focus and aperture of the lens unit 300 by controlling a lens drive motor and a diaphragm drive motor, not shown, in accordance with signals from the camera control unit 101. Based on outputs from a focus sensor having a plurality of distance measurement points within the shooting screen, a focus detecting unit 115 outputs amounts of defocus at the respective distance measurement points to the camera control unit 101. Based on the amounts of defocus output from the focus detecting unit 115, the camera control unit 101 instructs the lens control unit 114 to perform a focus adjusting operation. A posture detecting unit 116 is comprised of an acceleration sensor or the like and detects a posture of the camera 110 with respect to a direction of gravity.

An operating unit 117 includes a shutter release button which receives instructions to start a preparatory operation for shooting and start a shooting operation. When a shutter release switch SW1 is turned on with a first stroke (such as pressing halfway down) of the shutter release button, the camera control unit 101 starts a preparatory operation for shooting such as a focus detecting operation or a photometric operation. When a shutter release switch SW2 is turned on with a second stroke (such as pressing all the way down) of the shutter release button, the camera control unit 101 starts a shooting operation.

The operating unit 117 also includes an auto bounce switch which selects whether or not to provide automatic radiating direction control in which an optimum radiating direction of flash is automatically determined to drive the external flash 120 (auto bounce drive control). The operating unit 117 further includes, for example, an operating switch which suspends movement of a movable unit 122 (see FIGS. 2 and 3) which is drivingly controlled by a drive control unit 202 of the external flash 120 during the auto bounce drive.

A light emission control unit 118 controls flash patterns such as pre-flash and main flash and controls the amount of emitted light in accordance with signals from the camera control unit 101 when the built-in flash 119 is used. The light emission control unit 118 also provides control to select whether to apply control in accordance with signals from the camera control unit 101 to the built-in flash 119 or the external flash 120. A liquid crystal display unit 151 displays photometric values, warnings, and so forth for the camera 100 in accordance with display instructions from the camera control unit 101.

Figure 2:
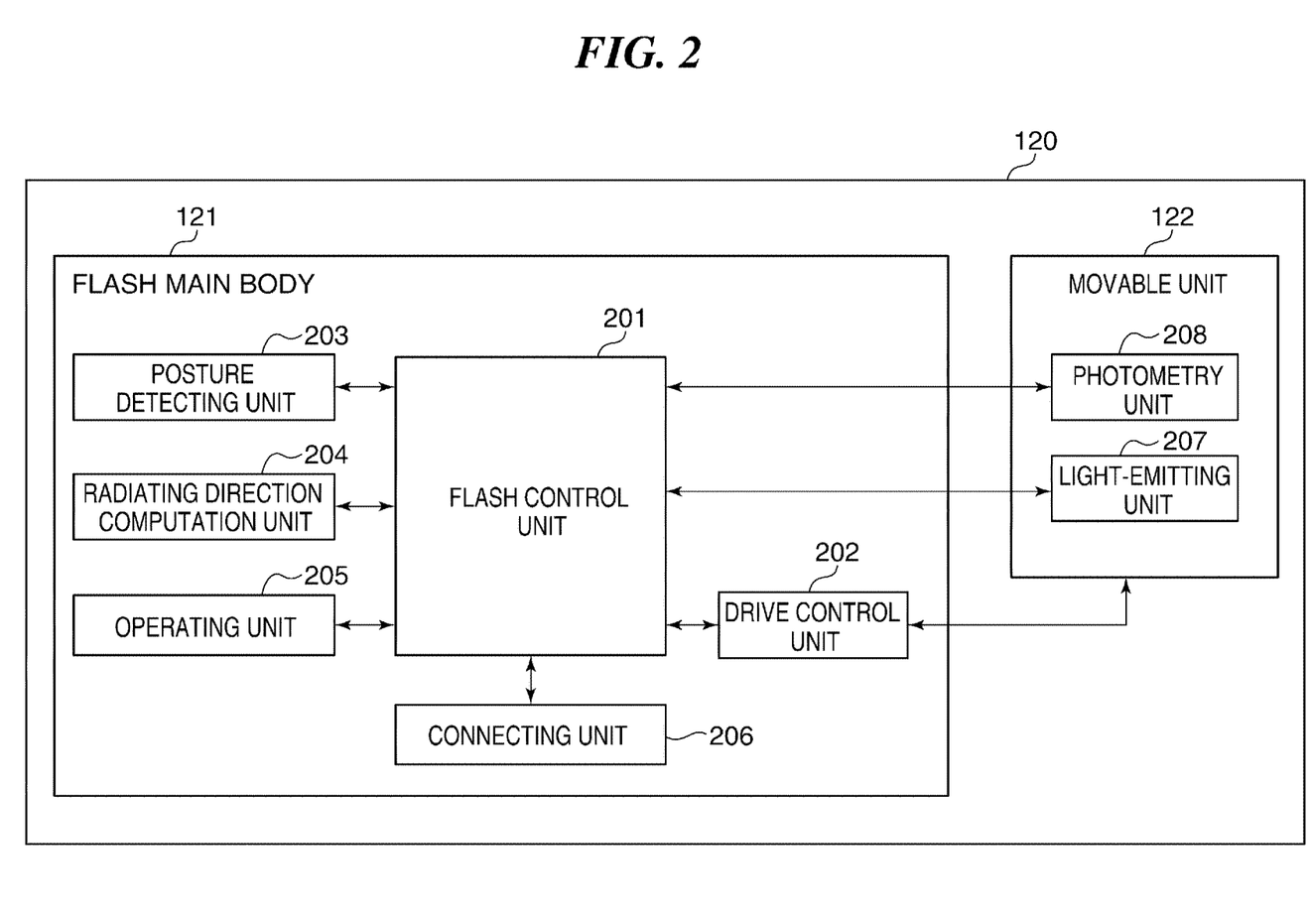
FIG. 2 is a block diagram schematically showing a system arrangement of an external flash.
Figure 3:
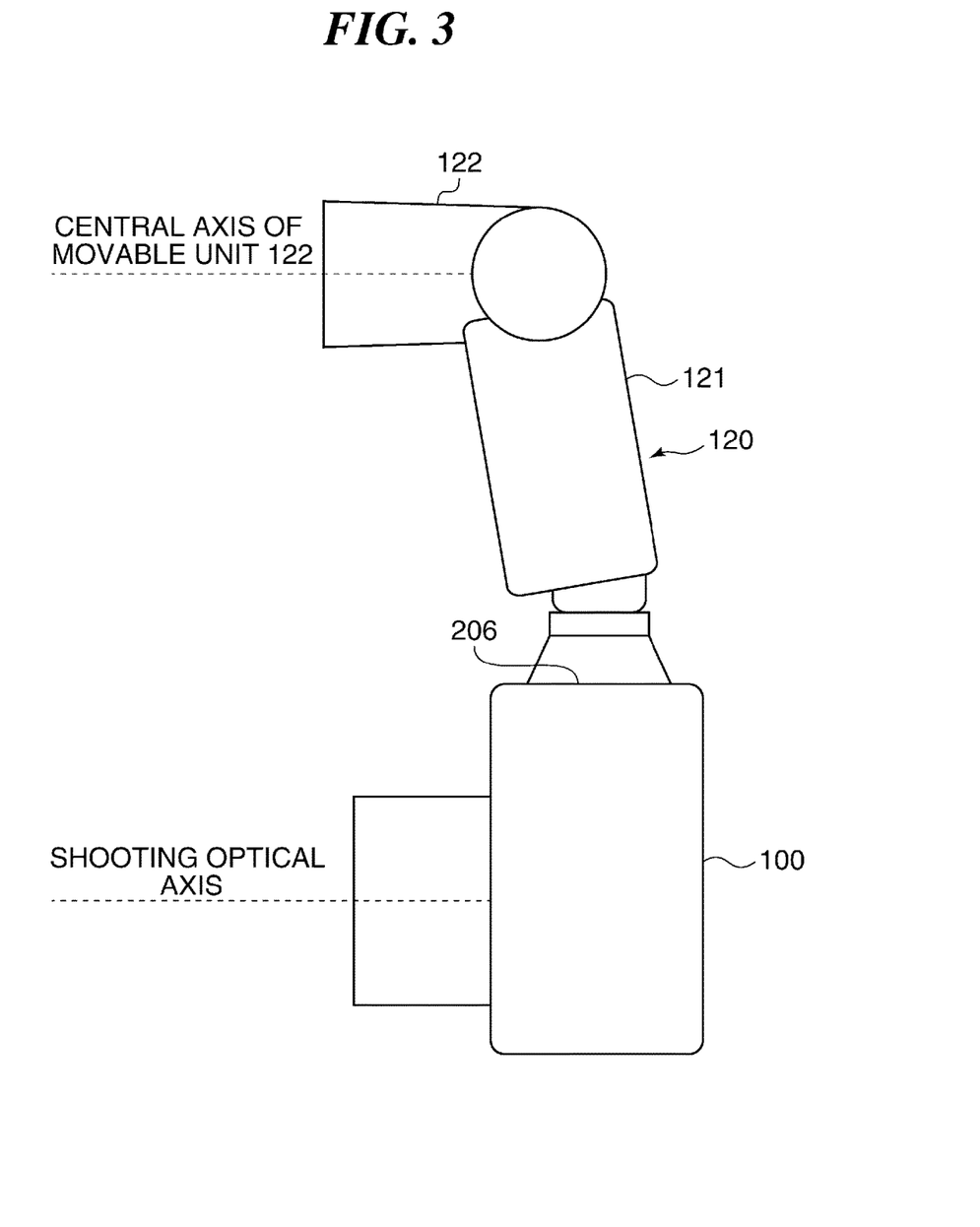
FIG. 3 is a view useful in explaining a reference position of a movable unit with respect to a flash main body.

FIG. 2 is a block diagram schematically showing a system arrangement of the external flash 120. FIG. 3 is a view useful in explaining a reference position of the movable unit 122 with respect to a flash main body 121.

As shown in FIGS. 2 and 3, the external flash 120 has the flash main body 121 which is removably mounted on the camera 100, and the movable unit 122 which is supported so as to be able to turn in a vertical direction and a horizontal direction with respect to the flash main body 121. The flash main body 121 has a flash control unit 201, a drive control unit 202, a posture detecting unit 203, a radiating direction computation unit 204, an operating unit 205, a connecting unit 206, and so forth, and the movable unit 122 has a light-emitting unit 207, a photometry unit 208, and so forth.

The flash control unit 201 has a CPU, a RAM, a ROM, and so forth, and controls the overall operation of the external flash 120. The drive control unit 202 controls a motor, not shown, in accordance with signals from the flash control unit 201 to drive the movable unit 122 in the vertical direction and the horizontal direction with respect to the flash main body 121. The drive control unit 202 also uses an encoder or the like to obtain an amount by which the movable unit 122 is driven from a reference position with respect to the flash main body 121 and outputs the obtained amount to the flash control unit 201.

It should be noted that the reference position of the movable unit 122 with respect to the flash main body 121 should be a position at which, for example, as shown in FIG. 3, a central axis of the movable unit 122 (an optical axis of the light-emitting unit 207) and a shooting optical axis of the camera 100 do not cross each other when the flash main body 121 is mounted on the camera 100.

The posture detecting unit 203 is comprised of an acceleration sensor or the like and detects a posture of the flash main body 121. The radiating direction computation unit 204 calculates an optimum radiating direction of flash radiated from the light-emitting unit 207 at the time of bounce flash photography based on posture information on the flash main body 121 obtained by the posture detecting unit 203 and photometric information obtained by the photometry unit 208 using a known computation method. The flash control unit 201 drives the movable unit 122 by controlling the drive control unit 202 such that the light-emitting direction 207 faces in the radiating direction of flash calculated by the radiating direction computation unit 204 at the time of bounce flash photography.

The operating unit 205 includes an auto bounce switch for selecting whether or not to provide the auto bounce drive control. It should be noted that when different settings are configured by the auto bounce switch of the operating unit 117 of the camera 100 and the auto bounce switch of the operating unit 250 of the external flash 120, the setting configured by either one of them should be given a higher priority.

Alternatively, the setting configured by the auto bounce switch of the operating unit 117 of the camera 100 and the setting configured by the auto bounce switch of the operating unit 205 of the external flash 120 should be used in coordination. Namely, when the setting configured by the auto bounce switch of one of the camera 100 and the external flash 120 is changed, the setting configured by the auto bounce switch of the other one should be automatically changed. The operating unit 117 also includes, for example, a suspending button for suspending movement of the movable unit 122 by the drive control unit 202 during the auto bounce drive.

The connecting unit 206 has a mounting unit for mounting on the camera 100, a contact of communication with the camera 100, and so forth. The flash control unit 201 carries out communications with the camera 100 via the contact of the connecting unit 206. The light-emitting unit 207 uses a flash discharge tube, an LED, or the like as a light source, has an optical system formed of resin or the like and placed in front of the light source, and emits light from the light source in accordance with a light emission signal from the flash control unit 201.

The photometry unit 208 has a light-receiving sensor having a light-receiving surface which faces in the same direction as a radiating direction of the light-emitting unit 207 and outputs a signal corresponding to a beam received by the light-receiving surface of the light-receiving sensor to the flash control unit 201. The flash control unit 201 calculates a distance from a radiating surface of an optical system of the light-emitting unit 207 to an object to be irradiated based on an output signal from the photometry unit 208 that has received a beam reflected from the object to be irradiated when the light-emitting unit 207 is caused to emit light.

It should be noted that the orientation and location of the light-receiving sensor is not limited to the above examples, but the light-receiving sensor may be configured to receive a beam reflected from the object to be irradiated via a light guide member such as an optical fiber or the like a light-incident surface of which is placed to face in the same direction as the radiating direction of the light-emitting unit 207.

In the present embodiment, as shown in FIG. 3, it is assumed that, for example, control in accordance with signals from the camera control unit 101 is applied to the external flash 120 in the image pickup system that includes the camera 100, which is an exemplary image pickup apparatus, and the external flash 120, which is an exemplary light-emitting apparatus.

Figure 4:
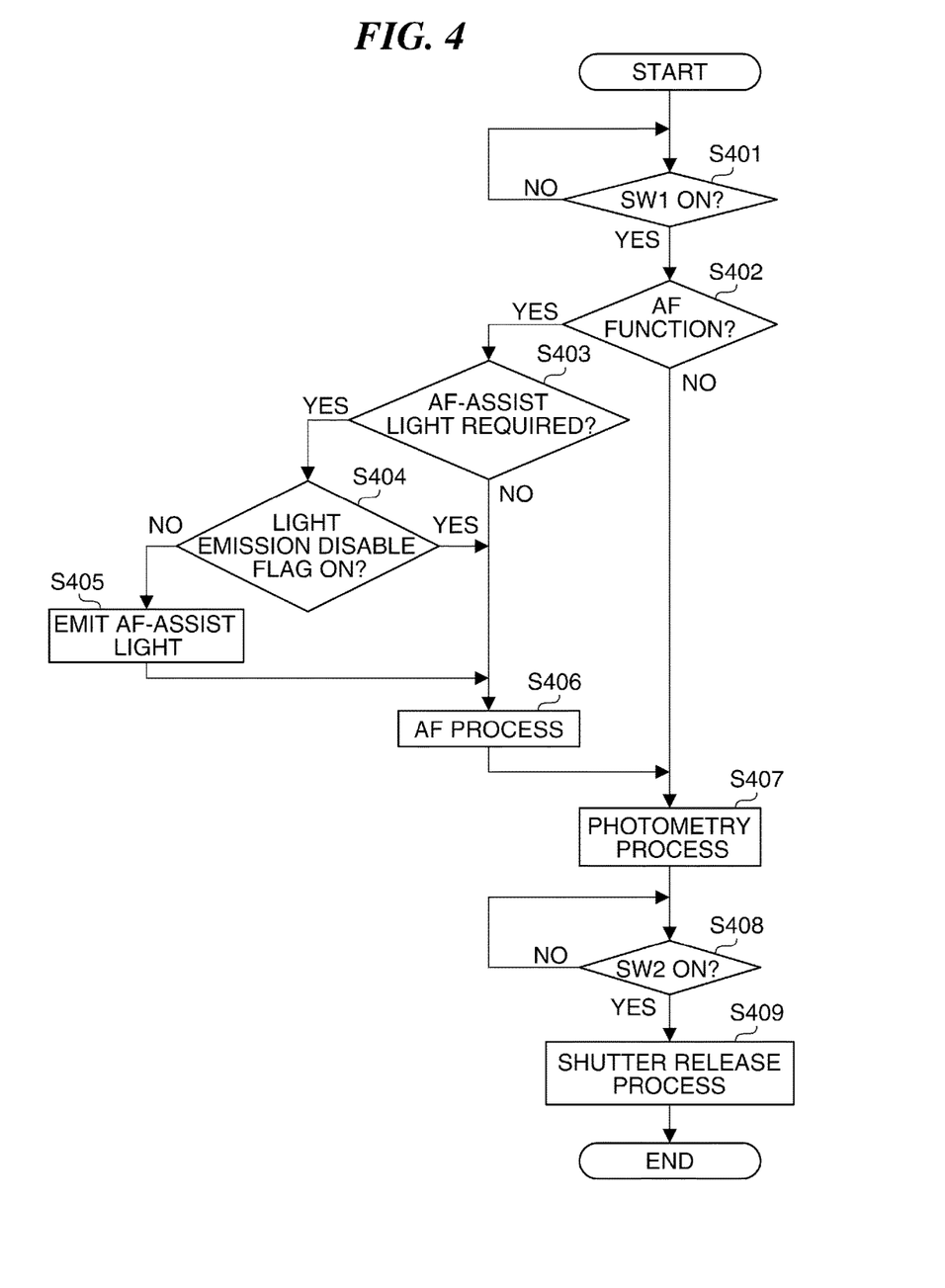
FIG. 4 is a flowchart showing a preparatory operation for shooting and a shooting operation by a digital camera.

FIG. 4 is a flowchart showing a preparatory operation for shooting and a shooting operation by the camera 100. Processes in FIG. 4 are carried out by the CPU or the like of the camera control unit 101 in accordance with programs stored in the ROM or the like and expanded into the RAM.

Referring to FIG. 4, in step S401, when the shutter release switch SW1 is turned on by, for example, the shutter release button being pressed halfway down, the process proceeds to step S402, in which the camera control unit 101 in turn starts to perform a preparatory operation for shooting. In the step S402, the camera control unit 101 judges whether or not an AF function is assigned to the shutter release switch SW1. When the AF function is assigned to the shutter release switch SW1, the process proceeds to step S403, and when not, the process proceeds to step S407.

In the step S403, the camera control unit 101 judges whether or not AF-assist light is necessary to perform an AF operation. For example, when a photometric value indicates that the subject has a low brightness or light around the subject is dark, the camera control unit 101 judges that AF-assist light is necessary since it is hard to detect a focus. When AF-assist light is necessary, the process proceeds to step S404, and when not, the process proceeds to step S406.

Figure 6:
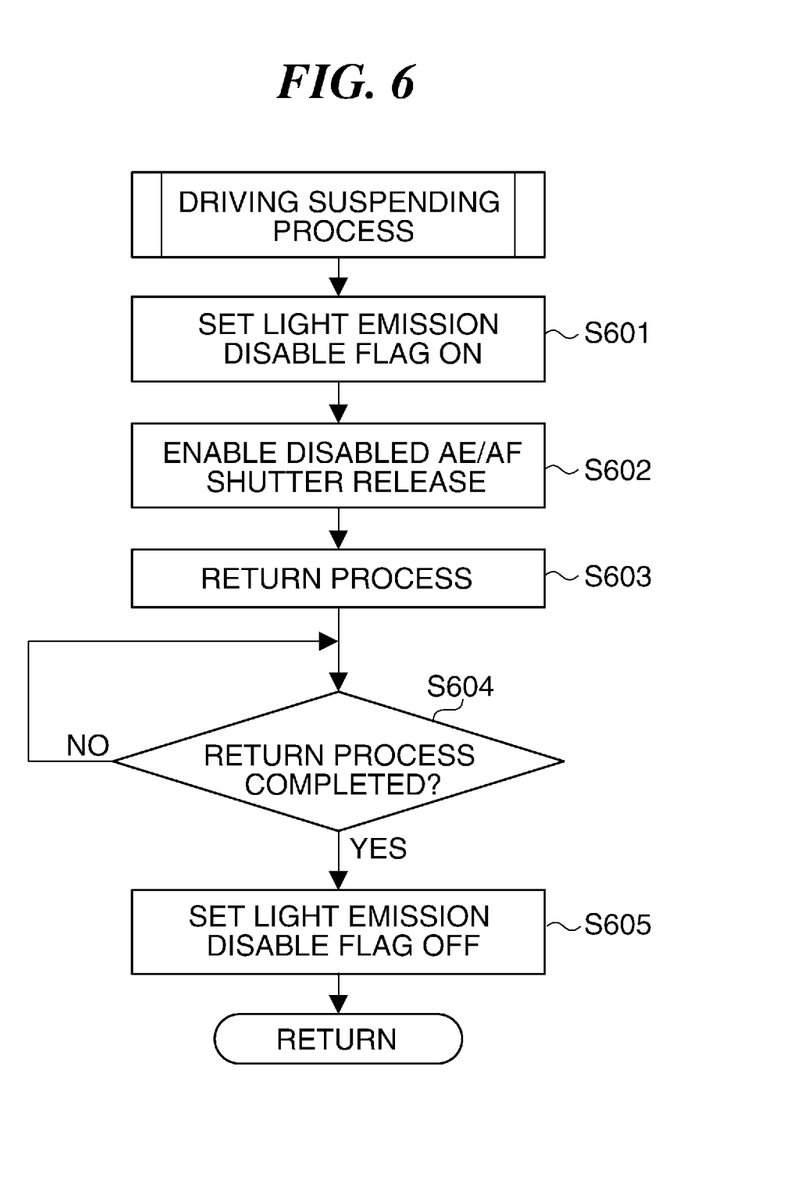
FIG. 6 is a flowchart useful in explaining how auto bounce drive is suspended in step S507 in FIG. 5.

In the step S404, the camera control unit 101 judges whether or not a light emission disable flag, to be described later with reference to FIG. 6, is on or off. When the camera control unit 101 judges that the light emission disable flag is on, the process proceeds to the step S406, and when the camera control unit 101 judges that the light emission disable flag is off, the process proceeds to step S405.

In the step S405, the camera control unit 101 communicates with the flash control unit 201 of the external flash 120 via the connecting unit 206 to carry out a process to emit AF-assist light using the light-emitting unit 207, followed by the process proceeding to the step S406. In the step S406, the camera control unit 101 carries out an AF process using the focus detecting unit 115 and the lens control unit 114, followed by the process proceeding to step S407.

In the step S407, the camera control unit 101 carries out a photometry process based on photometry results using the photometry unit 112, followed by the process proceeding to step S408. In the step S408, the camera control unit 101 judges whether or not the shutter release switch SW2 has been turned on by, for example, the shutter release button being pressed all the way down. When the shutter release switch SW2 has been turned on, the process proceeds to step S409, in which the camera control unit 101 in turn performs a shooting operation and ends the process.

Figure 5:
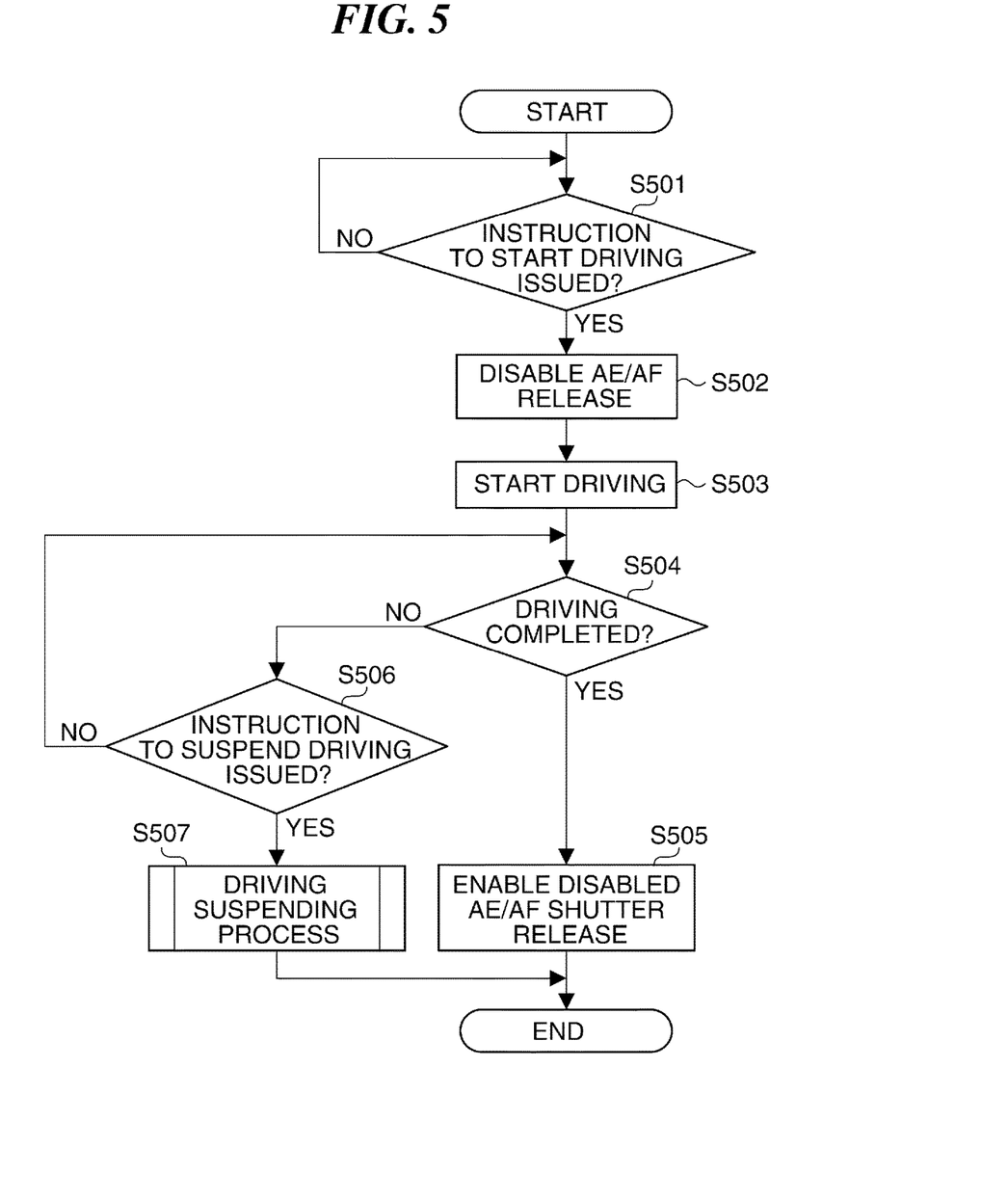
FIG. 5 is a flowchart useful in explaining how the digital camera works in response to an instruction to start auto bounce drive control.

FIG. 5 is a flowchart useful in explaining how the camera 100 works in response to an instruction to start the auto bounce drive control. Processes in FIG. 5 are carried out by the CPU or the like of the camera control unit 101 in accordance with programs stored in the ROM or the like and expanded into the RAM.

Referring to FIG. 5, in step S501, when the camera control unit 101 is instructed to start the auto bounce drive control by operating the operating unit 117 or the operating unit 205, the process proceeds to step S502. In the step S502, the camera control unit 101 disables a preparatory operation for shooting such as a photometric operation and AF performed in response to, for example, the shutter release button being pressed halfway down (SW1 on), and a shooting operation performed in response to, for example, the shutter release button being pressed all the way down (SW2 on), followed by the process proceeding to step S503.

In the step S503, the camera control unit 101 communicates with the flash control unit 201 via the connecting unit 206, causing the flash control unit 201 to start the auto bounce drive described above, followed by the process proceeding to step S504.

In the step S504, the camera control unit 101 communicates with the flash control unit 201 via the connecting unit 206 to judge whether or not the auto bounce drive by the flash control unit 201 has been completed. When the camera control unit 101 judges that the auto bounce drive has been completed, the process proceeds to step S505, and when the camera control unit 101 judges that the auto bounce drive has not been completed, the process proceeds to step S506.

In the step S505, the camera control unit 101 enables a preparatory operation for shooting such as a photometric operation and AF performed in response to, for example, the shutter release button being pressed halfway down (SW1 on), and a shooting operation performed in response to, for example, the shutter release button being pressed all the way down (SW2 on), and ends the process.

In the step S506, the camera control unit 101 judges whether or not an instruction to suspend the auto bounce drive has been issued. The instruction to suspend the auto bounce drive is issued, for example, when a shooting mode of the camera 100 has shifted to a video mode, when the shooting mode of the camera 100 has shifted to a flash prohibited mode, when the suspending button has been operated, or when a drive mode selector switch of the external flash 120 has been operated. When the instruction to suspend the auto bounce drive has been issued, the process proceeds to step S507, and when no instruction to suspend the auto bounce drive has been issued, the process returns to the step S504.

In the step S507, the camera control unit 101 suspends the auto bounce drive and ends the process. How to suspend the auto bounce drive here will now be described with reference to FIG. 6.

FIG. 6 is a flowchart useful in explaining how to suspend the auto bounce drive in the step S507 in FIG. 5.

Referring to FIG. 6, in step S601, the camera control unit 101 sets the light emission disable flag on, and the process proceeds to step S602. As described above with reference to FIG. 4, while the light emission disable flag is on, emission of AF-assist light may be disabled.

In the step S602, the camera control unit 101 enables a preparatory operation for shooting such as a photometric operation and AF performed in response to, for example, the shutter release button being pressed halfway down (SW1 on), and a shooting operation performed in response to, for example, the shutter release button being pressed all the way down (SW2 on), followed by the process proceeding to step S603. This enables the camera 100 to perform a preparatory operation for shooting.

In the step S603, the camera control unit 101 communicates with the flash control unit 201 via the connecting unit 206 to control the drive control unit 202 such that the flash control unit 201 returns the movable unit 122 to the reference position (initial position) in FIG. 3, followed by the process proceeding to step S604.

In the step S604, the camera control unit 101 judges whether or not the return of the movable unit 122 in the step S603 has completed, and when the return of the movable unit 122 in the step S603 has completed, the process proceeds to step S605. In the step S605, the camera control unit 101 sets the light emission disable flag off, which was set on in the step S601, and ends the process.

As described above, in the present embodiment, from the start to end of the suspending process for the auto bounce drive, the preparatory operation of shooting performed in response to, for example, the shutter release button being pressed halfway down (SW1 on) and a shooting operation performed in response to, for example, the shutter release button being pressed all the way down (SW2 on) are enabled. As a result, when the auto bounce drive is suspended during flash photography through the auto bounce drive control, a next shooting operation is quickly performed, which reduces the risk of the user missing the perfect moment to take a picture.

Moreover, in the present embodiment, from the start to end of the suspending process for the auto bounce drive, emission of AF-assist light may be disabled, and this prevents a light-emitting operation from being performed while the movable unit 122 is going back to the initial position.

Further, the external flash 120 used in the embodiment described above is supported such that the angle of the movable unit 122 having the light-emitting unit 207 is adjustable with respect to the flash main body 121. However, the auto bounce drive control of the embodiment described above may be applied to the built-in flash 119 as long as the built-in flash 119 is configured to be supported such that its angle is adjustable with respect to the camera 100. Alternatively, the built-in flash 119 and the external flash 120 may be configured to change a radiating direction of flash by changing an orientation of a light source or reflective umbrella.

Moreover, although in the embodiment described above, disabling the emission of AF-assist light is illustrated, this is not limitative, but the present invention may be applied to disabling the emission of light other than AF-assist light, such as modeling flash.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-220628, filed Nov. 11, 2016, which is hereby incorporated by reference herein in its entirety.

What is claimed is:

1. An image pickup system that has an image pickup apparatus and a light-emitting apparatus built in or removably mounted on the image pickup apparatus and capable of communicating with the image pickup apparatus, the light-emitting apparatus having a light-emitting unit that emits light and a drive unit that changes a radiating direction of light from the light-emitting unit, the image pickup system comprising:
a hardware processor; and
a memory that stores instructions, which when executed by the hardware processor, cause the image pickup system to:
disable a preparatory operation for shooting and a shooting operation by the image pickup apparatus while the radiating direction of the light is being changed by the drive unit;
determine whether or not an instruction to suspend changing the radiating direction of the light by the drive unit has been issued; and
enable, when the image pickup system determines that the instruction to suspend changing the radiating direction of the light by the drive unit has been issued, the preparatory operation for shooting and the shooting operation by the image pickup apparatus, which have been disabled, and control the drive unit such that the light-emitting unit returns to an initial position prior to the change of the radiating direction of the light from the light-emitting unit by the drive unit.

2. The image pickup system according to claim 1, wherein the memory stores instructions, which when executed by the hardware processor, cause the image pickup system to, when the image pickup system determines that the instruction to suspend changing the radiating direction of the light by the drive unit has been issued, disable a light-emitting process by the light-emitting unit.

3. The image pickup system according to claim 2, wherein the memory stores instructions, which when executed by the hardware processor, cause the image pickup system to, when the image pickup system determines that the instruction to suspend changing the radiating direction of the light by the drive unit has been issued, enable the preparatory operation for shooting and the shooting operation by the image pickup apparatus after the light-emitting process by the light-emitting unit is disabled.

4. The image pickup system according to claim 2, wherein the memory stores instructions, which when executed by the hardware processor, cause the image pickup system to return the light-emitting unit to the initial position prior to the change of the radiating direction of the light from the light-emitting unit by the drive unit, and then enable the disabled light-emitting process by the light-emitting unit.

5. The image pickup system according to claim 2, wherein the light-emitting process by the light-emitting unit is a light-emitting process in which AF-assist light or modeling light is emitted.

6. The image pickup system according to claim 1, wherein the memory stores instructions, which when executed by the hardware processor, cause the image pickup system to, when a shooting mode of the image pickup apparatus shifts to a movie mode, determine that the instruction to suspend changing the radiating direction of the light by the drive unit has been issued.

7. The image pickup system according to claim 1, wherein the memory stores instructions, which when executed by the hardware processor, cause the image pickup system to, when a suspending button provided in the image pickup apparatus is operated, determine that the instruction to suspend changing the radiation direction of the light by the driving unit has been issued.

8. The image pickup system according to claim 1, wherein the memory stores instructions, which when executed by the hardware processor, cause the image pickup system to, when a drive mode selector switch of the light-emitting apparatus is operated, determine that the instruction to suspend changing the radiation direction of the light by the driving unit has been issued.

9. An image pickup apparatus which has a built in or removably mounted light-emitting apparatus having a light-emitting unit that emits light and a drive unit that changes a radiating direction of the light from the light-emitting unit and which is capable of communicating with the light-emitting apparatus, the image pickup apparatus comprising:
a hardware processor; and
a memory that stores instructions, which when executed by the hardware processor, cause the image pickup apparatus to:
disable a preparatory operation for shooting and a shooting operation while the radiating direction of the light is being changed by the drive unit;
determine whether or not an instruction to suspend changing the radiating direction of the light by the drive unit has been issued; and
enable, when the image pickup apparatus determines that the instruction to suspend changing the radiating direction of the light by the drive unit has been issued, the preparatory operation for shooting and the shooting operation, which have been disabled, and control the drive unit such that the light-emitting unit returns to an initial position prior to the change of the radiating direction of the light from the light-emitting unit by the drive unit.

10. The image pickup apparatus according to claim 9, wherein the memory stores instructions, which when executed by the hardware processor, cause the image pickup apparatus to, when the image pickup apparatus determines that the instruction to suspend changing the radiating direction of the light by the drive unit has been issued, the control unit disables disable a light-emitting process by the light-emitting unit.

11. The image pickup apparatus according to claim 10, wherein the memory stores instructions, which when executed by the hardware processor, cause the image pickup apparatus to, when the image pickup apparatus determines that the instruction to suspend changing the radiating direction of the light by the drive unit has been issued, enable the preparatory operation for shooting and the shooting operation by the image pickup apparatus after the light-emitting process by the light-emitting unit is disabled.

12. The image pickup apparatus according to claim 10, wherein the control unit returns the memory stores instructions, which when executed by the hardware processor, cause the image pickup apparatus to return the light-emitting unit to the initial position prior to the change of the radiating direction of the light from the light-emitting unit by the drive unit, and then enable the disabled light-emitting process by the light-emitting unit.

13. The image pickup apparatus according to claim 10, wherein the light-emitting process by the light-emitting unit is a light-emitting process in which AF-assist light or modeling light is emitted.

14. The image pickup apparatus according to claim 9, wherein the memory stores instructions, which when executed by the hardware processor, cause the image pickup apparatus to, when a shooting mode of the image pickup apparatus shifts to a movie mode, determine that the instruction to suspend changing the radiating direction of the light by the drive unit has been issued.

15. The image pickup apparatus according to claim 9, wherein the memory stores instructions, which when executed by the hardware processor, cause the image pickup apparatus to, when a suspending button provided in the image pickup apparatus is operated, determine that the instruction to suspend changing the radiation direction of the light by the driving unit has been issued.

16. The image pickup apparatus according to claim 9, wherein the memory stores instructions, which when executed by the hardware processor, cause the image pickup apparatus to, when a drive mode selector switch of the light-emitting apparatus is operated, determine that the instruction to suspend changing the radiation direction of the light by the driving unit has been issued.

17. A control method for an image pickup apparatus which has a built in or removably mounted light-emitting apparatus having a light-emitting unit that emits light and a drive unit that changes a radiating direction of the light from the light-emitting unit and which is capable of communicating with the light-emitting apparatus, the control method comprising:
disabling a preparatory operation for shooting and a shooting operation performed while the radiating direction of the light is being changed by the drive unit;
determining whether or not an instruction to suspend changing the radiating direction of the light by the drive unit has been issued; and
enabling, when the image pickup apparatus determines that the instruction to suspend changing the radiating direction of the light by the drive unit has been issued, the preparatory operation for shooting and the shooting operation, which have been disabled, and controlling the drive unit such that the light-emitting unit returns to an initial position prior to the change of the radiating direction of the light from the light-emitting unit by the drive unit.

* * * * *